Aug. 14, 1951 H. EKNAYAN 2,564,157
ELECTRIC HEATING SYSTEM AND METHOD OF HEATING
Filed June 12, 1947 2 Sheets-Sheet 1
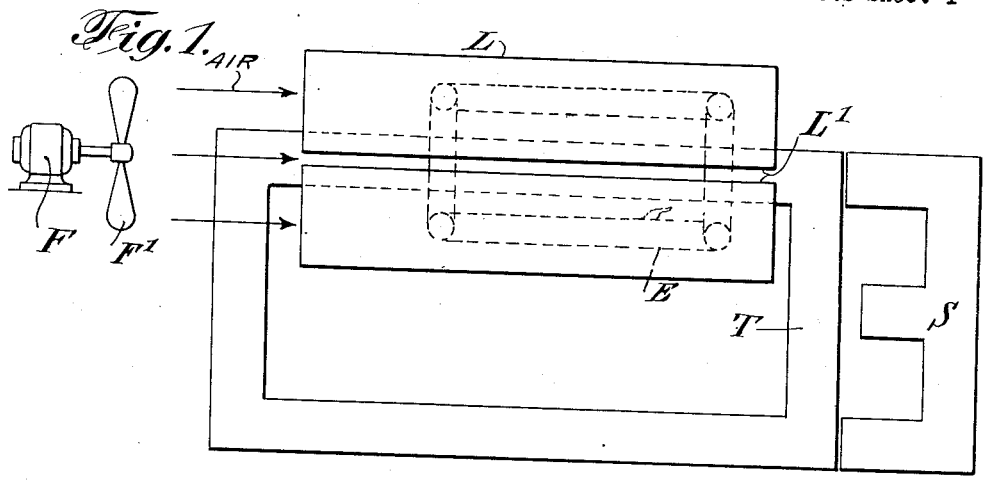
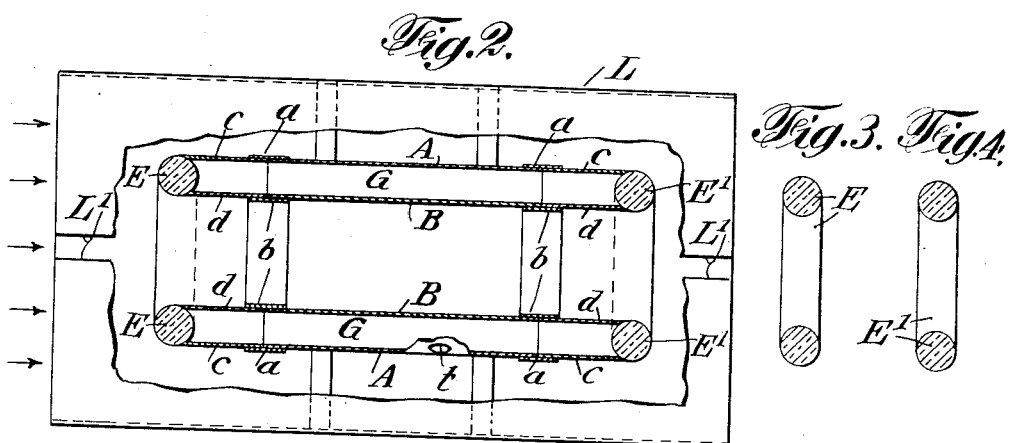
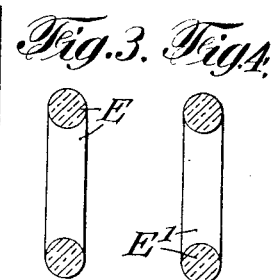
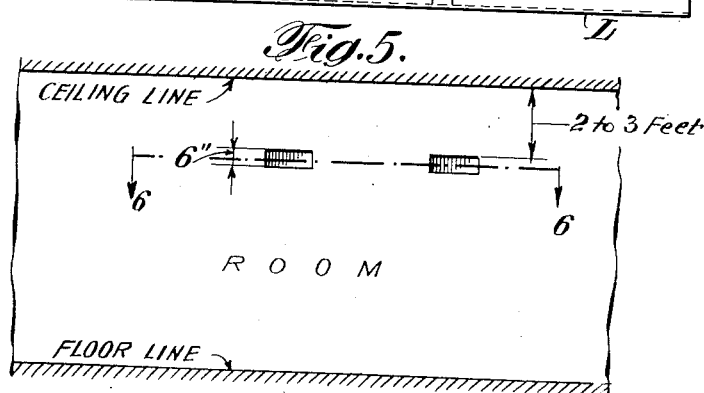
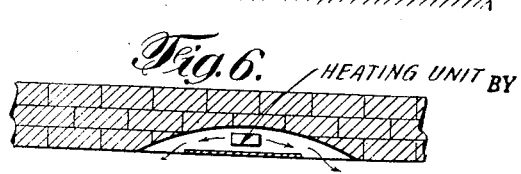
INVENTOR.
Hrant Eknayan
BY
C. P. Goepel
ATTORNEY Aug. 14, 1951
H. EKNAYAN
2,564,157
ELECTRIC HEATING SYSTEM AND METHOD OF HEATING
Filed June 12, 1947
2 Sheets-Sheet 2
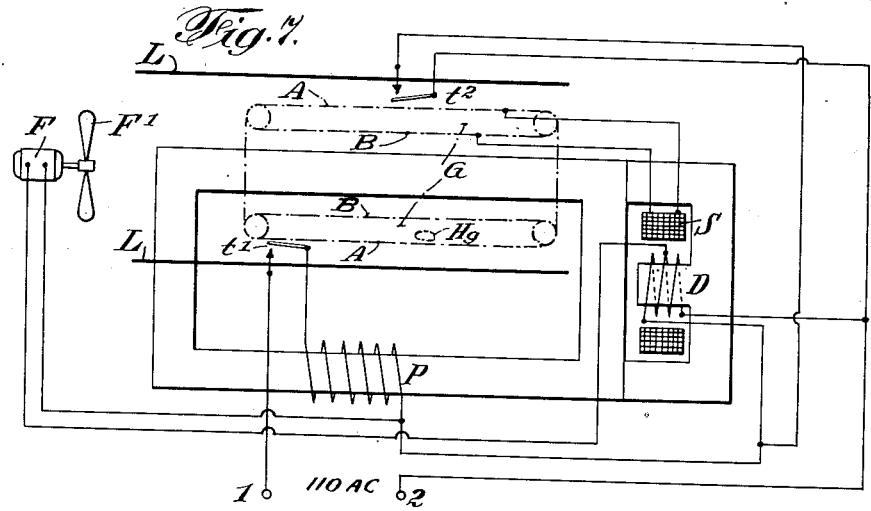
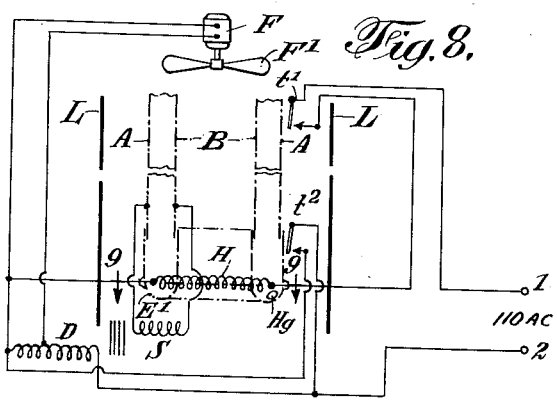
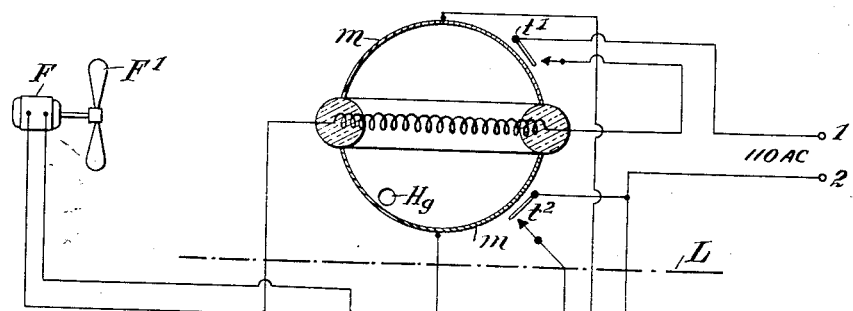
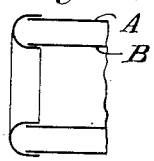
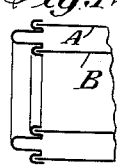
INVENTOR.
Hrant Eknayan
BY
C. P. Goepel
ATTORNEY Patented Aug. 14, 1951

2,564,157

UNITED STATES PATENT OFFICE 2,564,157

ELECTRIC HEATING SYSTEM AND METHOD OF HEATING

Hrant Eknayan, Union City, N. J.

Application June 12, 1947, Serial No. 754,215

25 Claims. (Cl. 219—39)

This invention relates to electric heating systems.

In all present electric heating appliances used on power frequencies (this is not high frequency heating) a filament, a grid or a ribbon is heated by sending a current through. The temperature of these high resistance elements runs in the air at about 750° to 900° centigrade. In addition to these heated elements a kind of reflector is used. Other heating appliances have a fan blowing air through the heated grids. All the above heating means are governed by the empirical formula, calories $$H = \frac{Eit}{4.18}$$

(t) in seconds. This is the heat generated by the resistance material alone when (i) current is sent through and E volts is generated across this heated filament by this current. After this heat is generated locally, it must be carried efficiently to all air molecules in the room and to the walls.

All the present electric heating appliances are inefficient and costly for the following reasons:

(1) Heat generation is governed by the above empirical formula;

(2) Too much heat is wasted by heating massy supporting or holding mediums;

(3) An inefficient system of carrying this heat generated to all air particles is used;

(4) Wattage consumption per unit is so high that electric room heating has been uneconomical compared to other heating systems, and at the present time there is no heating appliance consuming less than 1400 watts;

(5) This high current consumption necessitates that the houses be rewired;

(6) As the running temperatures of the filaments in air are too high, these filaments quickly disintegrate by oxidation or fatigue; and also, these high color temperatures, besides being fire hazards, are apt to interfere with sockets and connecting means;

(7) This high temperature takes away all the shine of the filament metal by oxidation making them good radiators, which is objectionable. (Oxidation brings down the color temperature of the filament thus drawing more current from the source.)

The present invention eliminates all the above disadvantages.

One of the fundamental principles of this invention is embodied in a novel method and in structure having two spaced members made of thin high resistance metal, i. e. nickel, that stays shiny up to 450° C., which members are heated not more than 450° centigrade under conditions hereinafter described, and these members are placed into a cylinder with open ends so that air could be blown gently through it, thus heating very efficiently all air molecules within the cylinder.

The invention will be more fully described hereinafter, an embodiment shown in the drawing, and the invention will be finally pointed out in the claims.

In the accompanying drawings,

Fig. 1 is a diagrammatic side view of the structure showing an embodiment of the invention;

Fig. 2 is a diagrammatic fragmentary detail view, with parts broken away;

Fig. 3 is a detail section of one of the glass rings;

Fig. 4 is a detail section of the other glass section;

Fig. 5 is a front view of a wall of a room to which the improved structure is applied;

Fig. 6 is a section taken on line 6—6 of Fig. 5;

Fig. 7 is a diagrammatic view of another embodiment of the invention;

Fig. 8 is a diagrammatic view of still another embodiment of the invention;

Fig. 9 is a section taken on line 9—9 of Fig. 8;

Fig. 10 is a diagrammatic view of a further embodiment of the invention, and

Figs. 11 and 12 are alternative forms of glass ring connection.

Similar characters of reference indicate corresponding parts throughout the various views.

Referring to the drawings, a cylinder or aluminum tube L (Fig. 2) of aluminium, has a longitudinal slot $L^1$. Within the cylinder L is placed a heating element consisting of an outside cylinder A and an inside cylinder B of smaller diameter concentric to cylinder A. The cylinders A and B are made of thin nickel, or nickel alloy, or other suitable metal. These could be made of Kovar. These two cylinders are sealed at their ends by a vacuum tight sealing medium, that is, a glass tubular ring, forming the cylinders into a vacuum tight receptacle G, which has a tubulation $t$, as shown. By this tubulation, the concentric metal discharge tube can be evacuated, processed and sealed off.

The glass sealing rings E, and $E^1$, are shown separately, in Figs. 3 and 4, respectively. In the embodiment shown in Fig. 2, each end of the cylinders A and B, short and concentric tubes c, and d, preferably made of Kovar metal are secured by welding, which metal fuses exceptionally well with the special glass rings E and E¹. Inner and outer bands a and b are used to cover the joints of the cylinders and end tubes.

The metal cylinders and tubes stay shiny up to 450 degrees centigrade in the air.

A long narrow core and coil type transformer T is shown in Fig. 1. A high leakage transformer with E shape laminations cooperates with the transformer T. The function of the air gap is to limit the current in the metal discharge enclosure used as the heating element. One leg of the transformer passes through the bore of the smaller cylinder B, and thus through the bore of the outer cylinder A, and the bore of the cylinder L.

On the left end of the aluminium pipe L is arranged and suitably supported an inexpensive low speed miniature blower motor F, for operating the fan F¹.

After degasifying (under vacuum) the receptacle G preferably by high frequency currents, some mercury and a rare gas (i. e. helium) is added, and the enclosure is sealed off.

This air tight receptacle G, or heating element, could operate also within the principles of my invention, without the addition of the rare gas. Instead of mercury, another heavy vapor will function. After the vapor or gases ionize, an arc is formed between the electrodes.

The operation is as follows:

When 110 volts A. C. is connected, the cylinders A and B forming the heating unit G become heated. This evaporates the mercury and then the reactive transformer causes a discharge between the two cylinders A and B, after the initial ionization. When this happens, the induction current is diminished.

When the surface temperature of the heating unit G passes 450° centigrade, a thermostat is actuated, and thereby the unit is disconnected from the source of electrical supply.

With such a unit, a room of good size can be heated during winter with 600 watts, a job done by the present heaters with more than 1400 watts.

If the discharge principle is not used, that is, only a single cylinder in the aluminum pipe in place of the double cylinder A and B as explained above, it will then take 1000 watts to do the job of the present 1400 watt units. This alone is a considerable improvement on the present heating appliances.

A unit can be used in every room. The unit G is placed about 2 or 3 feet below the ceiling in a shallow circular cavity in the brick wall as shown in Figs. 5 and 6. The depth of this cavity should be about 6 inches at the center.

As to what is the inherent fundamentals involved in the discharge, I believe that the heating of the cylinders of the heating unit by the discharge is done by one or more of the following phenomena:

(1) by cathode and anode disintegration of the metal;

(2) by the disintegration of the vapor mercury;

(3) by the positive ion bombardment;

(4) by some other phenomenon that I do not know yet.

In the above three phenomena, a certain amount of controlled atomic disintgration is believed to be the main cause of the energy saving.

Various embodiments of the foregoing invention may be worked out. Circuits also could be used depending on the gas loading of the heating element, kind and thickness of the metal of the tubes, size of the unit, ambient temperature, etc.

The discharge transformer, and the inductive element heating transformer may be in two separate units, that is, two separate transformers connected in series or parallel.

In some units when the concentric heating element loading is conductive enough or the ambient temperature is proper, then the preheating of the concentric tubes is not necessary, in that case a core and coil type transformer is not necessary, only the constant current discharge transformer will be used.

The preliminary heating could be done also without the core and coil type transformer; a heating resistance wire is then wrapped around the concentric tubular element, and current sent through this resistance wire. Of course, the discharge constant current transformer is always needed for the internal discharge.

From the foregoing it appears that the improvements consists of (a) a room heating appliance comprising a core and coil type transformer, one leg of the core carrying the primary turns, and around the other leg there is placed a tube made of thin, high resistance material which stays shiny between 200°–450° C. Through this tubular heating unit G, air is blown by a fan. The primary turns of the transformer are in series with a thermostatic switch placed on the tubular heating unit. When the temperature of the tube of the unit G reaches 450° C., this thermostatic switch disconnects the primary turns from the power source. (b) In addition, a longitudinally slotted aluminum pipe around the above heated tubular unit G is used, and the above fan blows air through this pipe also. (c) Also, a core and coil type transformer comprising on one leg the primary turns, around the other leg the two concentric tubes each made of thin high resistance material, are placed, which stays shiny up to 450° C. The adjacent ends of these concentric tubular elements are united by means of a vacuum tight non-metallic sealing element like glass, thus making a vacuum tight enclosure out of these two tubes. Electrical connecting means are provided that will induce current in the concentric heating elements until mercury is evaporated, during this time no discharge could be formed internally between the two concentric elements, because of insufficient secondary voltage across the two tubular elements, then due to the high leakage transformer with E shaped lamination, a discharge suddenly takes place between the two tubes. As soon as this takes place, the means to reduce or stop the induced heating current in the tubular elements operates, the discharge however going on. If tubular heating element temperature reaches 450° centigrade, due to this continued discharge, then means operate to disconnect the unit from the electrical supply. When the temperature of the concentric tubes falls below a certain level, the electrical supply is again connected, which causes the discharge to heat the tubes to the higher temperature of about 450° centigrade. The induced heating current which was used to heat the unit is not necessary as the unit is heated sufficiently to enable the discharge to take place. This on the assumption that the induced current has been stopped. When only reduced, then the induced heating current continues to act to evaporate mercury and to heat the unit in order to keep it at that temperature necessary for discharge, (ionization). The main heat is obtained by the discharge.

The glass rings could be of any cross-section that the development will prove the best, as for instance, such as shown in Figs. 11 and 12, which can take the place of the solid rings of Figs. 2, 3, 4 and 9.

An operating embodiment is shown in Fig. 7. When 110 volts A. C. is connected to the points 1 and 2, the primary coil P is energized alone because the thermostat $t^1$ makes connection or closes the circuit. The thermostat $t^2$ making also connection, the coil D on the E lamination is shorted. The induced current in the cylinders A and B heats them up, evaporates the liquid mercury, when the temperature of A reaches a certain value, then thermostat $t^2$ opens, thus putting the coil D in series with the coil P. As the secondary of coil P is shorted out by the cylinders, the coil D takes the great percentage of the 110 volts, thus its secondary coil S starts an internal discharged between the A and B cylinders. If the operating temperature of A reaches about 400–450° centigrade, the thermostat $t^1$ opens the primary circuit stopping both heating and discharge currents. When the temperature of A falls, below say 200° centigrade, the thermostat $t^1$, again makes contact, or closes the circuit, thus starting the discharge current between A and B.

It is understood also that the thermostat $t^2$ opens at a lower temperature than the opening temperature of thermostat $t^1$. The fan $F^1$ is energized after $t^2$ opens. The same slotted aluminium cylinder L shown in Fig. 1, is used in Fig. 7. The unit G formed of the cylinders A and B is constructed like that shown in Fig. 2.

Another embodiment is shown in Fig. 8. In Fig. 8, the core and coil transformer that heats up the cylinders A and B is eliminated. The top adjacent ends of the cylinders A and B are again sealed together by the circular hollow glass bead, which is not shown in Fig. 8, but may be solid as in Fig. 3 or tubular like Figs. 11 or 12. The lower adjacent ends of A and B are sealed by a glass volume of revolution $E^1$ whose cross-section has the form of a U, generally like Fig. 11. This hollow glass of U shape cross-section contains a tungsten filament H as shown, which leads $h$ (Fig. 9), and contains some mercury.

The operation is the same as in the case of Fig. 7. When 110 volt A. C. is applied at points 1 and 2, the high leakage transformer primary coil D is shorted out by the thermostat $t^2$ and the tungsten filament is put across 110 volts. When thermostat $t^2$ reaches a predetermined temperature, it opens, putting coil D in series with the tungsten filament across 110 volts. Now the secondary coil S of D starts an internal discharge between the A—B cylinders. If temperature of A reaches about 400–450° centigrade, the thermostat $t^1$ disconnects the whole unit from the 110 volt A. C. source. When temperature of A falls to about 200° centigrade the thermostat $t^1$ energizes again the unit.

Again the same aluminium cylinder L (not slotted this time) is used, as also the same fan $F^1$, which starts to run after the thermostat $t^2$ opens. The circuit of motor F is taken off taps of primary coil D.

Another embodiment is shown in Fig. 10. In Fig. 10 the core and coil type transformer is not needed. In this case, the heating element is formed by two semi-spherical metallic cups $m$, $m$, sealed together at their edge by the same doughnut shape solid glass bead, which in this case has two insulated leads imbedded. These leads are connected to the ends of a tungsten filament held in the vacuum tight discharge device and extending diametrically through the space formed by the cups. The lead connections are shown diagrammatically, the actual form being known to one skilled in the art. The operation is the same as in Fig. 8.

In all above embodiments there is a tubulation through which the vacuum discharge devices could be evacuated and processed. All embodiments contain mercury, or mercury and a rare gas like helium, or heavy vapor and helium.

In some certain designs the thermostats $t^1$ will not be needed, because when the discharge internal gas pressure reaches a certain value, the discharge stops because of insufficient secondary available voltage. When this happens the primary of the discharge transformer D becomes a high impedance which also practically stops the heating current.

This appliance could be made for any maximum and minimum temperature suitable in carrying out the invention. The maximum temperature depends on the softening point and vacuum holding ability of the end sealing means at this maximum temperature. As the temperature of the ionized gas increases, the current between A and B diminishes. When this current diminishes, the voltage between the primary coil D builds up (as it in series with another primary which has a shorted secondary). When this D voltage builds up, the fan motor voltage increases, which means an increase in the cubic feet of air going through. So, when the ionized temperature goes up, the speed of the fan increases. This facilitates the reaching of the stability point. As soon as the discharge starts, the fan operates. When the temperature builds up to maximum, the input current slightly lowers depending on the ionization or inside vapor heating stability in the unit. A floating effect takes place and the design of the currents must be accordingly. The regulation effect in all cases is obtained by the inside impedance action of the discharge.

The mercury in the discharge has a low arc drop because the ionization potential of mercury is low.

In all places in the foregoing disclosure, where mercury alone is in the discharge medium preheating means of the liquid mercury is essential.

In all places in the foregoing disclosure, where mercury and a rare gas other than helium is in the discharge medium, a preheating means is not essential.

In all places in the foregoing disclosure, where mercury and the rare gas helium is in the discharge medium a preheating means is essential.

When helium is ionized, an $\alpha$ ray particle could be formed, and the energy of the $\alpha$ ray depends on its speed with which it strikes the metallic electrodes. With the voltages referred to as being used in the discharge device, very fast $\alpha$ rays are not obtained.

A greater percentage of electrons taken out from the metallic electrode by positive ion bombardment is done by ionized helium which has to jump the electrode voltage drop. The existence of mercury vapor shortens this distance; ionized helium particles jump for the attraction of the electrons. The same electrode voltage drop divided by a very small distance makes the voltage gradient a very large value. This increases the speed of the ionized helium particles which by mere chance heat nuclei of heavy metals placed on electrode, or, the electrodes eject some neutrons, which are very essential in bombarding other nuclei of metals, if the speed of the neutrons is slow. The mercury vapor in the device will help to slow down the speed of the neutrons.

The heat of ionized gas between the electrodes must be added to the electrode heat. Mercury vapor is not a good heat conductor, but helium is a very good heat conductor, which provides another reason for the use of helium.

Helium will greatly help to form oxides, water vapor, or compounds in the discharge medium, if small amount of air creeps in through the metals, or if the metals give off occluded gases, hydrogen, etc.

I have described several forms of my invention, but obviously various changes may be made in the details disclosed without departing from the spirit of the invention as set out in the following claims.

I claim:

1. A heating system, comprising a tube of high resistance material which up to 450° centigrade does not change its surface characteristics in the air, said tube being air tight and having two parts insulated from each other, each acting as an electrode, a core and coil type transformer, one leg of which has primary turns, the other leg of which passes through said tube, causing induced current heating in said tube and evaporation of mercury in said tube, a high leakage transformer for ionizing helium in said tube, a spaced enclosure surrounding said tube, a fan for directing air from said tube out of said enclosure, an electric supply, a thermostat in series with the primary of the transformer, and a thermostat for said high leakage transformer.

2. A heating system, comprising a pair of concentric members forming a tube of a material which does not change its surface characteristics up to 450° C., air tight insulating means closing the ends of said concentric members, a core and coil type transformer, one leg of which has primary turns, the other leg of which extends into the bore of said concentric members, and cooperates therewith, a heavy vapor in the space between said concentric members, a high leakage transformer for creating a discharge between the members, by ionization, the primaries of said two transformers being in series, means cutting off the high leakage transformer to enable the first transformer to induce heating current within the concentric members, until the temperature reaches about 200° centrigrade, means cutting in the high leakage transformer for initiating the discharge within said members by ionization, which takes the highest percentage of line voltage because the secondary of the first transformer is shorted by the said members, whereby the induced current is reduced, means to cut off the source of electrical supply if their temperature reaches about 450° centigrade, means cutting in the supply when the temperature is below a certain amount, about 200° centigrade determined by the minimum mercury vapor necessary to begin the discharge with the available transformer voltage, the discharge again taking place between the members during which time a small induced heating current continues as a small percentage of the line voltage is across the primary of the core and coil transformer, an aluminum cylinder surrounding said members, longitudinally slotted, and a fan for moving the air from members out of said cylinder, and an electric supply, also connected with the motor of the fan after the preliminary heating of the members by the induced current.

3. A heating system, like claim 2, having also a rare gas as helium within said members.

4. A heating system like claim 2, having a heavy vapor instead of the mercury.

5. In a heating system the combination of, a gaseous discharge device having a metallic filament with two metallic electrodes exposed to the air, and insulated from each other, to form a closed air tight receptacle, a high leakage transformer in series with said filament, across an A. C. line voltage, means to short the primary of the high leakage transformer in the beginning, and means to remove the short of the primary of the high leakage transformer when the temperature of the receptacle reaches a predetermined value, initiating a gaseous discharge between the metallic electrodes.

6. In a heating system the combination of, a gaseous discharge device having a metallic filament with two electrodes exposed to the air, and insulated from each other, to form a closed air tight receptacle, a high leakage transformer in series with said filament, across an A. C. line voltage, means to short the primary of the high leakage transformer in the beginning, means to remove the short of the primary of the high leakage transformer when the temperature of the receptacle reaches a predetermined value, initiating a gaseous discharge between the electrodes, a fan blowing the hot air from the electrodes, and a motor for the fan supplied by a tap from the high leakage transformer primary, thus operating the fan only when the high leakage transformer primary is not shorted.

7. In a heating system, two metallic cups, which stay shiny up to about 450° C., a glass ring sealing air tight the edges of the cups, two connecting wires imbedded in said glass ring, a filament connecting these wires and extending across the inclosure formed by the cups diametrically across the glass ring, a high leakage transformer primary in series with the filament, this primary shorted by a thermostat, means opening said thermostat when the temperature of the cups reaches about 200° C., thus initiating an internal discharge between the cups by the high leakage transformer secondary, the primary not shorted, means to stop the discharge between the cups, when the temperature of the cups reaches about 450° C., an aluminum pipe placed around the cups, a fan for blowing air through this aluminum pipe, and a motor in electrical circuit with said primary, operative when the primary of the high leakage transformer is not shorted.

8. A heating system comprising metallic electrodes which are in contact with the air providing an electrical gaseous discharge, and having electrical insulating sealing means which unite both metallic electrodes to form an evacuated discharge medium, the area of each metallic electrode being larger than the external area of the electrical sealing means, an aluminum pipe surrounding said discharge medium, and means blowing air through said pipe from said discharge medium.

9. A heating system comprising metallic electrodes which are in contact with the air providing an electrical gaseous discharge, and having electrical insulating sealing means which unite both metallic electrodes to form an evacuated discharge medium, the area of each metallic electrode being larger than the external area of the electrical sealing means, means preheating the interior of said discharge medium for the initiation of said discharge, an aluminum pipe surrounding said discharge medium, and means blowing air through said pipe and from said discharge medium.

10. A heating system comprising metallic electrodes which are in contact with the air providing an electrical gaseous discharge, and having electrical insulating sealing means which unite both metallic electrodes to form an evacuated discharge medium, the area of each metallic electrode being larger than the external area of the electrical sealing means, an aluminum pipe surrounding said discharge medium, and means blowing air through said pipe and from said discharge medium, said discharge medium containing a heavy vapor and a rare gas.

11. A heating system comprising metallic electrodes which are in contact with the air providing an electrical gaseous discharge, and having electrical insulating sealing means which unite both metallic electrodes to form an evacuated discharge medium, the area of each metallic electrode being larger than the external area of the electrical sealing means, means preheating the interior of said discharge medium for the initiation of said discharge, an aluminum pipe surrounding said discharge medium, and means blowing air through said pipe and from said discharge medium, said discharge medium containing mercury and helium.

12. A heating system comprising metallic electrodes which are in contact with the air providing an electrical gaseous discharge, and having electrical insulating sealing means which unite both metallic electrodes to form an evacuated discharge medium, the area of the metallic electrodes being larger than the external area of the electrical sealing means, a high leakage transformer, for the initiation of said discharge, an aluminum pipe surrounding said discharge medium, and means blowing air through said pipe and from said discharge medium, said discharge medium containing a heavy vapor and a rare gas.

13. A heating system comprising metallic electrodes which are in contact with the air providing an electrical gaseous discharge, and having electrical insulating sealing means which unite both metallic electrodes to form an evacuated discharge medium, the area of the metallic electrodes being larger than the external area of the electrical sealing means, a high leakage transformer, for the initiation of said discharge, an aluminum pipe surrounding said discharge medium, and means blowing air through said pipe and from said discharge medium, said discharge medium containing mercury and helium.

14. An electric heating system comprising electrodes exposed to the air, sealing means between said electrodes for forming with the electrodes a vacuum tight receptacle, the area of the exterior surfaces of the electrodes in contact with the ambient air being larger than the area of the exterior surfaces of the sealing means in contact with the ambient air, a heavy vapor forming element in said receptacle, and a high leakage transformer with a secondary connected with each electrode, to create a discharge between the electrodes, whereby the electrodes are utilized as a heat source when an internal discharge takes place.

15. An electric heating system comprising electrodes exposed to the air, sealing means between said electrodes for forming with the electrodes a vacuum tight receptacle, the area of the exterior surfaces of the electrodes in contact with the ambient air being larger than the area of the exterior surfaces of the sealing means in contact with the ambient air, a heavy vapor forming element in said receptacle, means for preheating said element, and a high leakage transformer with a secondary connected with each electrode, to create a discharge between the electrodes, whereby the electrodes are utilized as a heat source when an internal discharge takes place.

16. An electric heating system comprising electrodes exposed to the air, sealing means between said electrodes for forming with the electrodes a vacuum tight receptacle, the area of the exterior surfaces of the electrodes in contact with the ambient air being larger than the area of the exterior surfaces of the sealing means in contact with the ambient air, a heavy vapor and a rare gas forming element in said receptacle, means for preheating said element and a rare gas in said receptacle, and a high leakage transformer with a secondary connected with each electrode, to create a discharge between the electrodes, whereby the electrodes are utilized as a heat source when a discharge takes place.

17. An electric heating system comprising electrodes exposed to the air, sealing means between said electrodes for forming with the electrodes a vacuum tight receptacle, the area of the exterior surfaces of the electrodes in contact with the ambient air being larger than the area of the exterior surfaces of the sealing means in contact with the ambient air, mercury in said receptacle, and a high leakage transformer with a secondary connected with each electrode, to create a discharge between the electrodes, whereby the electrodes are utilized as a heat source when a discharge takes place.

18. An electric heating system comprising electrodes exposed to the air, sealing means between said electrodes for forming with the electrodes a vacuum tight receptacle, the area of the exterior surfaces of the electrodes in contact with the ambient air being larger than the area of the exterior surfaces of the sealing means in contact with the ambient air, mercury and helium in said receptacle, and a high leakage transformer with a secondary connected with each electrode, to create a discharge between the electrodes, whereby the electrodes are utilized as a heat source when a discharge takes place.

19. An electric heating system comprising concentric cylindrical electrodes exposed to the air, sealing means between said electrodes for forming with the electrodes a vacuum tight receptacle, the area of the exterior surfaces of the electrodes in contact with the ambient air being larger than the area of the exterior surfaces of the sealing means in contact with the ambient air, a heavy vapor forming element in said receptacle, a core transformer one leg of which is within the bore of the cylindrical electrodes, and a high leakage transformer with a secondary connected with each electrode, to create a discharge between the electrodes, whereby the electrodes are utilized as a heat source when a discharge takes place.

20. An electric heating system comprising electrodes exposed to the air, sealing means between said electrodes for forming with the electrodes a vacuum tight receptacle, the area of the exterior surfaces of the electrodes in contact with the ambient air being larger than the area of the exterior surfaces of the sealing means in contact with the ambient air, a heavy vapor forming element in said receptacle, a metallic filament in said receptacle, and a high leakage transformer with a secondary connected with each electrode, to create a discharge between the electrodes, whereby the electrodes are utilized as a heat source when a discharge takes place.

21. In a method of electrical heating in which an air tight receptacle having its outer surfaces exposed to the ambient air is formed of two metallic electrodes joined by an insulating heating means separating the electrodes, the method which consists in subjecting said electrodes at their inner surfaces to a voltage to initiate and sustain an internal discharge, generating heat by positive ion bombardment by said discharge on said electrodes, and generating heat in the ionized gas, during the sustaining of said discharge, whereby the ambient air directly around and in contact with the outer side of the heater electrodes is heated.

22. The method described in claim 21, in which the discharge medium includes mercury.

23. The method described in claim 21, in which the discharge medium includes mercury and helium.

24. The method described in claim 21, in which the discharge medium includes a heavy vapor.

25. The method described in claim 21, in which the discharge medium includes a heavy vapor and a rare gas.

HRANT EKNAYAN.

REFERENCES CITED

The following references are of record in the file of this patent:

UNITED STATES PATENTS

| Number | Name | Date |
|---|---|---|
| 1,407,061 | Gray | Feb. 21, 1922 |
| 1,854,912 | Spaeth | Apr. 19, 1932 |
| 2,004,577 | Lebedenko | June 11, 1935 |
| 2,028,548 | Kirsten | Jan. 21, 1936 |
| 2,237,569 | Lofgren | Apr. 8, 1941 |
| 2,256,101 | Muller | Sept. 16, 1941 |
| 2,359,021 | Campbell et al. | Sept. 26, 1944 |
| 2,359,057 | Skinner | Sept. 26, 1944 |
| 2,424,454 | Gordon | July 22, 1947 |

FOREIGN PATENTS

| Number | Country | Date |
|---|---|---|
| 36,228 | Netherlands | Aug. 8, 1935 |